United States Patent
Zhou

(10) Patent No.: US 11,947,076 B2
(45) Date of Patent: Apr. 2, 2024

(54) CAMERA OPTICAL LENS

(71) Applicant: AAC Optics (Changzhou) Co., Ltd., Changzhou (CN)

(72) Inventor: Xuepeng Zhou, Shenzhen (CN)

(73) Assignee: AAC Optics (Changzhou) Co., Ltd., Changzhou (CN)

(*) Notice: Subject to any disclaimer, the term of this patent is extended or adjusted under 35 U.S.C. 154(b) by 668 days.

(21) Appl. No.: 17/131,766

(22) Filed: Dec. 23, 2020

(65) Prior Publication Data
US 2021/0263282 A1 Aug. 26, 2021

(30) Foreign Application Priority Data
Feb. 25, 2020 (CN) .......................... 202010117507.0

(51) Int. Cl.
*G02B 9/64* (2006.01)
*G02B 13/00* (2006.01)
*G02B 13/06* (2006.01)
*G02B 27/00* (2006.01)

(52) U.S. Cl.
CPC ............ *G02B 13/0045* (2013.01); *G02B 9/64* (2013.01); *G02B 13/06* (2013.01); *G02B 27/0025* (2013.01)

(58) Field of Classification Search
CPC .... G02B 13/001; G02B 13/002; G02B 13/04; G02B 13/0045; G02B 13/06; G02B 13/18; G02B 9/64; G02B 15/1461; G02B 15/173; G02B 15/28; H04N 23/55

USPC .................................................. 359/751, 755
See application file for complete search history.

(56) References Cited

U.S. PATENT DOCUMENTS

| 11,567,301 B2* | 1/2023 | Zhou ........................ G02B 9/64 |
| 2017/0090150 A1* | 3/2017 | Naruse ............... G02B 27/0025 |
| 2019/0004285 A1* | 1/2019 | Tang ........................ G02B 9/64 |
| 2019/0227277 A1* | 7/2019 | Tang ........................ G02B 9/64 |
| 2021/0149162 A1* | 5/2021 | Jhang ................... G02B 27/005 |

FOREIGN PATENT DOCUMENTS

CN 109212717 A 1/2019

* cited by examiner

*Primary Examiner* — Nicholas R. Pasko
*Assistant Examiner* — Samanvitha Sridhar
(74) *Attorney, Agent, or Firm* — W&G Law Group

(57) ABSTRACT

Provided is a camera optical lens including, from an object side to an image side: a first lens having a positive refractive power, a second lens having a negative refractive power, a third lens having a negative refractive power, a fourth lens having a positive refractive power, a fifth lens having a negative refractive power, a sixth lens having a positive refractive power, and a seventh lens having a negative refractive power, and the camera optical lens satisfies following conditions: $2.80 \leq v1/v2 \leq 4.30$; $5.00 \leq f4/f \leq 12.00$; $-4.00 \leq f5/f \leq -1.50$; and $-20.00 \leq R13/R14 \leq -5.00$. The camera optical lens has good optical performance while satisfying the requirements of ultra-thin, wide-angle lenses having large apertures.

10 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is conventionally equipped in mobile phone cameras adopts a three-piece or four-piece lens structure, or even a five-piece or six-piece structure. Also, with the development of technology and the increasing diverse demands from users, the pixel area of photosensitive devices is becoming smaller and smaller and the requirement of the system on the imaging quality is increasingly higher, a seven-piece lens structure gradually emerges in lens designs. Although the common seven-piece lens has good optical performance, its settings on refractive power, lens spacing and lens shape still have some deficiencies, such that the lens structure may not meet the requirements for a good optical performance and design requirements for ultra-thin, wide-angle lenses having a large aperture at the same time.

SUMMARY

In view of the problems, the present disclosure provides a camera lens, which can satisfy design requirements for ultra-thin, wide-angle lenses having a large aperture while achieving a good optical performance.

In an embodiment, the present disclosure provides a camera optical lens. The camera optical lens includes, from an object side to an image side, a first lens having a positive refractive power, a second lens having a negative refractive power, a third lens having a negative refractive power, a fourth lens having a positive refractive power, a fifth lens having a negative refractive power, a sixth lens having a positive refractive power, and a seventh lens having a negative refractive power. The camera optical lens satisfies following conditions: $2.80 \le v1/v2 \le 4.30$; $5.00 \le f4/f \le 12.00$; $-4.00 \le f5/f \le -1.50$; and $-20.00 \le R13/R14 \le -5.00$, where v1 denotes an abbe number of the first lens; v2 denotes an abbe number of the second lens; f denotes a focal length of the camera optical lens; f4 denotes a focal length of the fourth lens; f5 denotes a focal length of the fifth lens; R13 denotes a curvature radius of an object side surface of the seventh lens; and R14 denotes a curvature radius of an image side surface of the seventh lens.

As an improvement, the first lens is made of a glass material.

As an improvement, the camera optical lens further satisfies a following condition: $5.00 \le (R3+R4)/(R3-R4) \le 15.00$, where R3 denotes a curvature radius of an object side surface of the second lens; and R4 denotes a curvature radius of an image side surface of the second lens.

As an improvement, the camera optical lens further satisfies a following condition: $-8.00 \le f2/f \le -3.50$, where f2 denotes a focal length of the second lens.

As an improvement, the camera optical lens further satisfies following conditions: $0.49 \le f1/f \le 1.65$; $-4.45 \le (R1+R2)/(R1-R2) \le -1.17$; and $0.08 \le d1/TTL \le 0.25$, where f1 denotes a focal length of the first lens; R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $-29.59 \le f3/f \le -3.34$; $1.08 \le (R5+R6)/(R5-R6) \le 9.33$; and $0.02 \le d5/TTL \le 0.07$, where f3 denotes a focal length of the third lens; R5 denotes a curvature radius of an object side surface of the third lens; R6 denotes a curvature radius of an image side surface of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $-4.62 \le (R7+R8)/(R7-R8) \le -0.88$; and $0.03 \le d7/TTL \le 0.10$, where R7 denotes a curvature radius of an object side surface of the fourth lens; R8 denotes a curvature radius of an image side surface of the fourth lens; d7 denotes an on-axis thickness of the fourth lens; and TTL denotes a total optical length from an object side surface of the first lens to an image plane of the camera optical lens along an optic axis.

As an improvement, the camera optical lens further satisfies following conditions: $1.31 \le (R9+R10)/(R9-R10) \le 8.38$; and $0.03 \le d9/TTL \le 0.09$, where R9 denotes a curvature radius of an object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies following conditions: $0.32 \le f6/f \le 1.30$; $-1.81 \le (R11+R12)/(R11-R12) \le -0.58$; and $0.03 \le d11/TTL \le 0.14$, where f6 denotes a focal length of the sixth lens; R11 denotes a curvature radius of an object side surface of the sixth lens; R12 denotes a curvature radius of an image side surface of the sixth lens; d11 denotes an on-axis thickness of the sixth lens; and TTL denotes a total optical length from an object side surface of the first lens to an image plane of the camera optical lens along an optic axis.

As an improvement, the camera optical lens further satisfies following conditions: $-1.43 \le f7/f \le -0.47$; $0.33 \le (R13+R14)/(R13-R14) \le 1.36$; and $0.03 \le d13/TTL \le 0.11$, where f7 denotes a focal length of the seventh lens; d13 denotes an on-axis thickness of the seventh lens; and TTL denotes a total optical length from an object side surface of the first lens to an image plane of the camera optical lens along an optic axis.

The present disclosure has the following beneficial effects. The camera optical lens according to the present disclosure is an ultra-thin, wide-angle lenses having good optical characteristics and a large aperture, which are especially suitable for camera lens assembly of mobile phones and WEB camera lenses formed by CCD, CMOS and other imaging elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
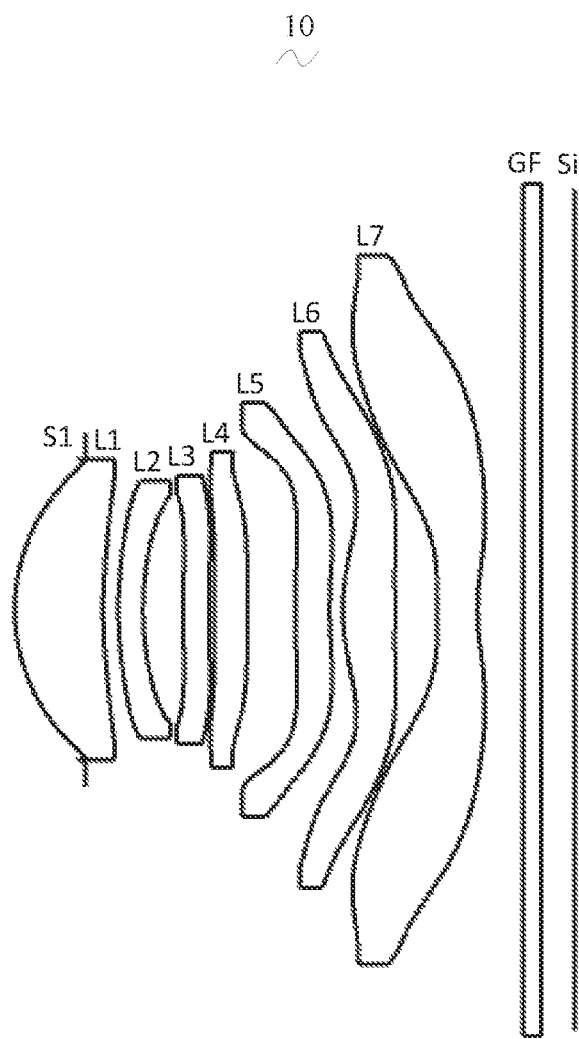
FIG. 1 is a structural schematic diagram of a camera optical lens according to Embodiment 1 of the present disclosure.

The present disclosure provides a camera optical lens 10. FIG. 1 shows the camera optical lens 10 according to Embodiment 1 of the present disclosure. The camera optical lens 10 includes seven lenses. For example, the camera optical lens 10 includes, from an object side to an image side, an aperture S 1, a first lens L1 having a positive refractive power, a second lens L2 having a negative refractive power, a third lens L3 having a negative refractive power, a fourth lens L4 having a positive refractive power, a fifth lens L5 having a negative refractive power, a sixth lens L6 having a positive refractive power, and a seventh lens L7 having a negative refractive power. The first lens L1 includes an object side surface being convex in a paraxial region and an image side surface being concave in the paraxial region. The second lens L2 includes an object side surface being convex in the paraxial region and an image side surface being concave in the paraxial region. The third lens L3 includes an object side surface being convex in the paraxial region and an image side surface being concave in the paraxial region. The fourth lens L4 includes an object side surface being convex in the paraxial region and an image side surface being concave in the paraxial region. The fifth lens L5 includes an object side surface being convex in the paraxial region and an image side surface being concave in the paraxial region. The sixth lens L6 includes an object side surface being convex in the paraxial region and an image side surface being convex in the paraxial region. The seventh lens L7 includes an object side surface being concave in the paraxial region and an image side surface being concave in the paraxial region. An optical element such as an optical filter (GF) can be arranged between the seventh lens L7 and an image plane Si.

The first lens L1 is made of a glass material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material.

An abbe number of the first lens L1 is defined as v1, and an abbe number of the second lens L2 is defined as v2. The camera optical lens 10 should satisfy a condition of $2.80 \leq v1/v2 \leq 4.30$, which specifies a ratio of the abbe number v1 of the first lens L1 to the abbe number v2 of the second lens L2. When the condition is satisfied, it is beneficial for development towards ultra-thin lenses while aberration can be advantageously corrected. As an example, $2.85 \leq v1/v2 \leq 4.25$.

A focal length of the camera optical lens 10 is defined as f, and a focal length of the fourth lens L4 is defined as f4. The camera optical lens 10 should satisfy a condition of $5.00 \leq f4/f \leq 12.00$, which specifies a ratio of the focal length f4 of the fourth lens L4 to the focal length f of the system. This condition leads to the more appropriate distribution of the refractive power, thereby achieving a better imaging quality and a lower sensitivity of the system. As an example, $5.03 \leq f4/f \leq 11.98$.

The focal length of the camera optical lens 10 is defined as f, and a focal length of the fifth lens L5 is defined as f5. The camera optical lens 10 should satisfy a condition of $-4.00 \leq f5/f \leq -1.50$, which specifies a ratio of the focal length f5 of the first lens L5 to the focal length f of the system. This condition leads to the more appropriate distribution of the refractive power, thereby achieving a better imaging quality and a lower sensitivity of the system. As an example, $-3.99 \leq f5/f \leq -1.50$.

A curvature radius of an object side surface of the seventh lens is defined as R13, and a curvature radius of an image side surface of the seventh lens is defined as R14. The camera optical lens 10 should satisfy a condition of $-20.00 \leq R13/R14 \leq -5.00$, which specifies a shape of the seventh lens L7. This condition can facilitate the correction of an off-axis aberration with development towards ultra-thin lenses. As an example, $-19.85 \leq R13/R14 \leq -5.03$.

A curvature radius of an object side surface of the second lens L2 is defined as R3, and a curvature radius of an image side surface of the second lens L2 is defined as R4. The camera optical lens 10 should satisfy a condition of $5.00 \leq (R3+R4)/(R3-R4) \leq 15.00$, which specifies a shape of the second lens L2. This condition can alleviate the deflection of light passing through the lens while effectively reducing aberrations. As an example, $5.03 \leq (R3+R4)/(R3-R4) \leq 14.85$.

The focal length of the camera optical lens 10 is defined as f, and a focal length of the second lens L2 is defined as f2. The camera optical lens 10 should satisfy a condition of $-8.00 \leq f2/f \leq -3.50$, which specifies a ratio of the focal length f2 of the second lens L2 to the focal length f of the system. When the condition is satisfied, a spherical aberration and a field curvature of the system can be effectively balanced. As an example, $-7.98 \leq f2/f \leq -3.53$.

In the present embodiment, the first lens L1 includes an object side surface being convex in a paraxial region and an image side surface being concave in the paraxial region.

The focal length of the camera optical lens 10 is defined as f, and a focal length of the first lens L1 is defined as f1. The camera optical lens 10 should satisfy a condition of $0.49 \leq f1/f \leq 1.65$, which specifies a ratio of the positive refractive power of the first lens L1 to the focal length of the system. When the condition is satisfied, the first lens L1 can have an appropriate positive refractive power, aberrations of the system can be reduced while facilitating development towards ultra-thin, wide-angle lenses. As an example, $0.79 \leq f1/f \leq 1.32$.

A curvature radius of the object side surface of the first lens L1 is defined as R1, and a curvature radius of the image side surface of the first lens L1 is defined as R2. The camera optical lens 10 should satisfy a condition of $-4.45 \leq (R1+R2)/(R1-R2) \leq -1.17$, which can reasonably control a shape of the first lens L1, allowing the first lens L1 to effectively correct spherical aberrations of the system. As an example, $-2.78 \leq (R1+R2)/(R1-R2) \leq -1.47$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.08 \leq d1/TTL \leq 0.25$, which achieves the ultra-thin lenses. As an example, $0.13 \leq d1/TTL \leq 0.20$.

In the present embodiment, the second lens L2 includes an object side surface being convex in a paraxial region and an image side surface being concave in the paraxial region.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \leq d3/TTL \leq 0.07$, which achieves the ultra-thin lenses. As an example, $0.03 \leq d3/TTL \leq 0.05$.

In the present embodiment, the third lens L3 includes an object side surface being convex in a paraxial region and an image side surface being concave in the paraxial region.

The focal length of the camera optical lens 10 is f, and a focal length of the third lens L3 is f3. The camera optical lens 10 should satisfy a condition of $-29.59 \leq f3/f \leq -3.34$. The appropriate distribution of the refractive power leads to better imaging quality and a lower sensitivity of the system. As an example, $-18.50 \leq f3/f \leq -4.17$.

A curvature radius of the object side surface of the third lens L3 is defined as R5, and a curvature radius of the image side surface of the third lens L3 is defined as R6. The camera optical lens 10 should satisfy a condition of $1.08 \leq (R5+R6)/(R5-R6) \leq 9.33$, which specifies a shape of the third lens L3, thereby facilitating the shaping of the third lens L3. This condition can alleviate the deflection of light passing through the lens while effectively reducing aberrations. As an example, $1.72 \leq (R5+R6)/(R5-R6) \leq 7.46$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.02 \leq d5/TTL \leq 0.07$, which achieves the ultra-thin lenses. As an example, $0.04 \leq d5/TTL \leq 0.05$.

In the present embodiment, the fourth lens L4 includes an object side surface being convex in a paraxial region and an image side surface being concave in the paraxial region.

A curvature radius of the object side surface of the fourth lens L4 is defined as R7, and a curvature radius of the image side surface of the fourth lens L4 is defined as R8. The camera optical lens 10 should satisfy a condition of $-4.62 \leq (R7+R8)/(R7-R8) \leq -0.88$, which specifies a shape of the fourth lens L4. This condition can facilitate the correction of an on-axis aberration with development towards ultra-thin lenses. As an example, $-2.89 \leq (R7+R8)/(R7-R8) \leq -1.10$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.03 \leq d7/TTL \leq 0.10$, which achieves the ultra-thin lenses. As an example, $0.05 \leq d7/TTL \leq 0.08$.

In the present embodiment, the fifth lens L5 includes an object side surface being convex in a paraxial region and an image side surface being concave in the paraxial region.

A curvature radius of the object side surface of the fifth lens L5 is defined as R9, and a curvature radius of the image side surface of the fifth lens L5 is defined as R10. The camera optical lens 10 should satisfy a condition of $1.31 \leq (R9+R10)/(R9-R10) \leq 8.38$, which specifies a shape of the fifth lens L5. This condition can facilitate the correction of an off-axis aberration with development towards ultra-thin lenses. As an example, $2.09 \leq (R9+R10)/(R9-R10) \leq 6.70$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.03 \leq d9/TTL \leq 0.09$, which achieves the ultra-thin lenses. As an example, $0.04 \leq d9/TTL \leq 0.07$.

In the present embodiment, the sixth lens L6 includes an object side surface being convex in a paraxial region and an image side surface being convex in the paraxial region.

The focal length of the camera optical lens 10 is f, and a focal length of the sixth lens L6 is f6. The camera optical lens 10 further satisfies a condition of $0.32 \leq f6/f \leq 1.30$. The appropriate distribution of the positive refractive power leads to better imaging quality and a lower sensitivity of the system. As an example, $0.52 \leq f6/f \leq 1.04$.

A curvature radius of the object side surface of the sixth lens L6 is defined as R11, and a curvature radius of the image side surface of the sixth lens L6 is defined as R12. The camera optical lens 10 should satisfy a condition of $-1.81 \leq (R11+R12)/(R11-R12) \leq -0.58$, which specifies a shape of the sixth lens L6. This condition can facilitate the correction of an off-axis aberration with development towards ultra-thin lenses. As an example, $-1.13 \leq (R11+R12)/(R11-R12) \leq -0.73$.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of $0.03 \leq d11/TTL \leq 0.14$, which achieves the ultra-thin lenses. As an example, $0.05 \leq d11/TTL \leq 0.11$.

In the present embodiment, the seventh lens L7 includes an object side surface being concave in a paraxial region and an image side surface being concave in the paraxial region.

The focal length of the camera optical lens 10 is f, and a focal length of the seventh lens L7 is f7. The camera optical lens 10 further satisfies a condition of $-1.43 \leq f7/f \leq -0.47$. Within such a range, the appropriate distribution of the negative refractive power leads to better imaging quality and a lower sensitivity of the system. As an example, $-0.90 \leq f7/f \leq -0.58$.

A curvature radius of the object side surface of the seventh lens L7 is defined as R13, and a curvature radius of the image side surface of the seventh lens L7 is defined as R14. The camera optical lens 10 should satisfy a condition of $0.33 \leq (R13+R14)/(R13-R14) \leq 1.36$, which specifies a shape of the seventh lens L7. This condition can facilitate the correction of an off-axis aberration with development towards ultra-thin lenses. As an example, $0.54 \leq (R13+R14)/(R13-R14) \leq 1.08$.

An on-axis thickness of the seventh lens L7 is defined as d13, and the total optical length from the object side surface of the first lens L1 to an image plane of the camera optical lens 10 along an optic axis is defined as TTL. The camera optical lens 10 should satisfy a condition of $0.03 \leq d13/TTL \leq 0.11$, which achieves the ultra-thin lenses. As an example, $0.05 \leq d13/TTL \leq 0.09$.

In the present embodiment, an image height of the camera optical lens 10 is defined as IH, and the total optical length of the camera optical lens 10 is defined as TTL. The camera optical lens 10 should satisfy a condition of $TTL/IH \leq 1.34$, which achieves the ultra-thin lenses.

In the present embodiment, an F number (FNO) of the camera optical lens 10 is smaller than or equal to 1.64, thereby achieving a large aperture and high imaging performance.

In the present embodiment, a FOV (field of view) of the camera optical lens 10 is greater than or equal to 80.00°, thereby achieving the wide-angle performance.

In the present embodiment, the focal length of the camera optical lens 10 is defined as f, and a combined focal length of the first lens L1 and the second lens L2 is defined as f12. The camera optical lens 10 should satisfy a condition of $0.59 \leq f12/f \leq 1.83$. This condition can eliminate aberration and distortion of the camera optical lens 10, suppress a back focal length of the camera optical lens 10, and maintain miniaturization of the camera lens system group. As an example, $0.95 \leq f12/f \leq 1.46$.

When the focal length of the camera optical lens 10, the focal lengths and the radius of curvature of the respective lenses of the present disclosure satisfy the above conditions, the camera optical lens 10 will have good optical performance while satisfying design requirements for ultra-thin, wide-angle lenses having large apertures. With these characteristics, the camera optical lens 10 is especially suitable for camera optical lens assembly of mobile phones and WEB camera optical lenses formed by high-pixel imaging elements such as CCD and CMOS.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (the total optical length from the object side surface of the first lens L1 to the image plane of the camera optical lens along the optic axis) in units of mm.

In an example, inflexion points and/or arrest points can be arranged on the object side surface and/or image side surface of the lens, so as to satisfy the demand for the high quality imaging. The specific implementations are described below.

Table 1 and Table 2 shows design data of the camera optical lens 10 according to Embodiment 1 of the present disclosure.

TABLE 1

| | R | d | | nd | | vd |
|---|---|---|---|---|---|---|
| S1 | ∞ | d0 = | −0.782 | | | |
| R1 | 2.034 | d1 = | 0.977 | nd1 | 1.5267 | v1 | 76.60 |
| R2 | 5.351 | d2 = | 0.165 | | | |
| R3 | 3.648 | d3 = | 0.275 | nd2 | 1.6700 | v2 | 19.39 |
| R4 | 2.983 | d4 = | 0.447 | | | |
| R5 | 17.834 | d5 = | 0.280 | nd3 | 1.6700 | v3 | 19.39 |
| R6 | 12.892 | d6 = | 0.060 | | | |
| R7 | 15.322 | d7 = | 0.367 | nd4 | 1.5346 | v4 | 55.69 |
| R8 | 38.685 | d8 = | 0.532 | | | |
| R9 | 8.000 | d9 = | 0.376 | nd5 | 1.5661 | v5 | 37.71 |
| R10 | 3.598 | d10 = | 0.149 | | | |
| R11 | 2.258 | d11 = | 0.576 | nd6 | 1.5346 | v6 | 55.69 |
| R12 | −39.485 | d12 = | 0.472 | | | |
| R13 | −15.741 | d13 = | 0.440 | nd7 | 1.5346 | v7 | 55.69 |
| R14 | 2.345 | d14 = | 0.500 | | | |
| R15 | ∞ | d15 = | 0.210 | ndg | 1.5168 | vg | 64.21 |
| R16 | ∞ | d16 = | 0.364 | | | |

Table 2 shows aspheric surface data of respective lens in the camera optical lens 10 according to Embodiment 1 of the present disclosure.

TABLE 2

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −8.9537E−01 | −1.9726E−01 | 5.4299E−02 | −1.1420E−01 | 1.5194E−01 | −1.2713E−01 | 6.7076E−02 | −2.1631E−02 | 3.8938E−03 | −3.0048E−04 |
| R2 | −8.4702E+01 | 8.2439E−03 | 1.2584E−02 | −6.5116E−02 | 1.0755E−01 | −9.4247E−02 | 4.8457E−02 | −1.4606E−02 | 2.3683E−03 | −1.5835E−04 |
| R3 | −3.4527E+00 | −6.0243E−02 | 2.0915E−02 | 3.7203E−02 | −4.8648E−02 | 3.1644E−02 | −1.1800E−02 | 2.4770E−03 | −2.7042E−04 | 1.1922E−05 |
| R4 | 2.4097E+00 | −6.3156E−02 | 1.0441E−01 | −3.6052E−01 | 9.3284E−01 | −1.4314E+00 | 1.3369E+00 | −7.4649E−01 | 2.2909E−01 | −2.9671E−02 |
| R5 | −3.7026E+01 | −3.6901E−02 | 6.0570E−02 | −1.8904E−01 | 2.7718E−01 | −2.3829E−01 | 1.2087E−01 | −3.5081E−02 | 5.3710E−03 | −3.3637E−04 |
| R6 | −9.0087E+01 | −3.6418E−02 | 5.0459E−02 | −9.4417E−02 | 6.9058E−02 | −8.2120E−03 | −2.0104E−02 | 1.3785E−02 | −3.6434E−03 | 3.5115E−04 |
| R7 | 4.5339E+01 | −7.9954E−02 | 8.9394E−02 | −1.3086E−01 | 1.1680E−01 | −6.2302E−02 | 2.2445E−02 | −5.4899E−03 | 7.9592E−04 | −4.9643E−05 |
| R8 | 1.9680E+01 | −7.5896E−02 | 7.8510E−02 | −1.2141E−01 | 1.1910E−01 | −7.3280E−02 | 2.8600E−02 | −6.6820E−03 | 8.4220E−04 | −4.4076E−05 |
| R9 | −9.4993E+00 | −9.2346E−02 | 1.2848E−01 | −1.6517E−01 | 1.4623E−01 | −9.1146E−02 | 3.7522E−02 | −9.6607E−03 | 1.4006E−03 | −8.6299E−05 |
| R10 | −7.2571E+00 | −1.8973E−01 | 1.5154E−01 | −1.1473E−01 | 6.7418E−02 | −2.8514E−02 | 7.8927E−03 | −1.3123E−03 | 1.1751E−04 | −4.3322E−06 |
| R11 | −2.1973E+00 | −7.6169E−02 | 1.2102E−02 | −1.1599E−02 | 5.0429E−03 | −8.7884E−04 | 5.4168E−05 | 2.4695E−06 | −4.7761E−07 | 1.7338E−08 |
| R12 | −2.2550E+01 | 6.0735E−02 | −6.1104E−02 | 1.7612E−02 | −7.0124E−04 | −7.9223E−04 | 2.1218E−04 | −2.4746E−05 | 1.4194E−06 | −3.2611E−08 |

TABLE 2-continued

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R13 | 1.4267E+01 | −1.8933E−01 | 8.8564E−02 | −2.0493E−02 | 2.7877E−03 | −2.2989E−04 | 1.1149E−05 | −2.7790E−07 | 1.8066E−09 | 3.5491E−11 |
| R14 | −1.4523E+01 | −1.0088E−01 | 4.3319E−02 | −1.0283E−02 | 1.3667E−03 | −9.0990E−05 | 7.3550E−07 | 3.0058E−07 | −1.8102E−08 | 3.3592E−10 |

In Table 2, k is a conic coefficient, and A4, A6, A8, A10, A12, A14, A16, A18 and A20 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18^{18}+A20^{20} \quad (1)$$

In the present embodiment, an aspheric surface of each lens surface uses the aspheric surfaces represented by the above condition (1). However, the present disclosure is not limited to the aspherical polynomial form represented by the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, P6R1 and P6R2 represent the object side surface and the image side surface of the sixth lens L6, and P7R1 and P7R2 represent the object side surface and the image side surface of the seventh lens L7, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.615 | | | |
| P1R2 | 1 | 1.315 | | | |
| P2R1 | 0 | | | | |
| P2R2 | 0 | | | | |
| P3R1 | 1 | 0.405 | | | |
| P3R2 | 1 | 0.475 | | | |
| P4R1 | 2 | 0.295 | 1.145 | | |
| P4R2 | 2 | 0.175 | 1.335 | | |
| P5R1 | 2 | 0.445 | 1.785 | | |
| P5R2 | 4 | 0.385 | 1.835 | 2.035 | 2.265 |
| P6R1 | 4 | 0.675 | 1.895 | 2.635 | 2.705 |
| P6R2 | 3 | 0.205 | 0.705 | 2.365 | |
| P7R1 | 2 | 1.425 | 3.515 | | |
| P7R2 | 3 | 0.485 | 3.185 | 3.645 | |

TABLE 4

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 1 | 0.655 | |
| P3R2 | 1 | 0.775 | |
| P4R1 | 2 | 0.545 | 1.405 |
| P4R2 | 2 | 0.315 | 1.625 |
| P5R1 | 1 | 0.855 | |
| P5R2 | 1 | 0.735 | |
| P6R1 | 1 | 1.165 | |
| P6R2 | 2 | 0.355 | 0.905 |
| P7R1 | 1 | 3.085 | |
| P7R2 | 1 | 1.055 | |

Figure 2:
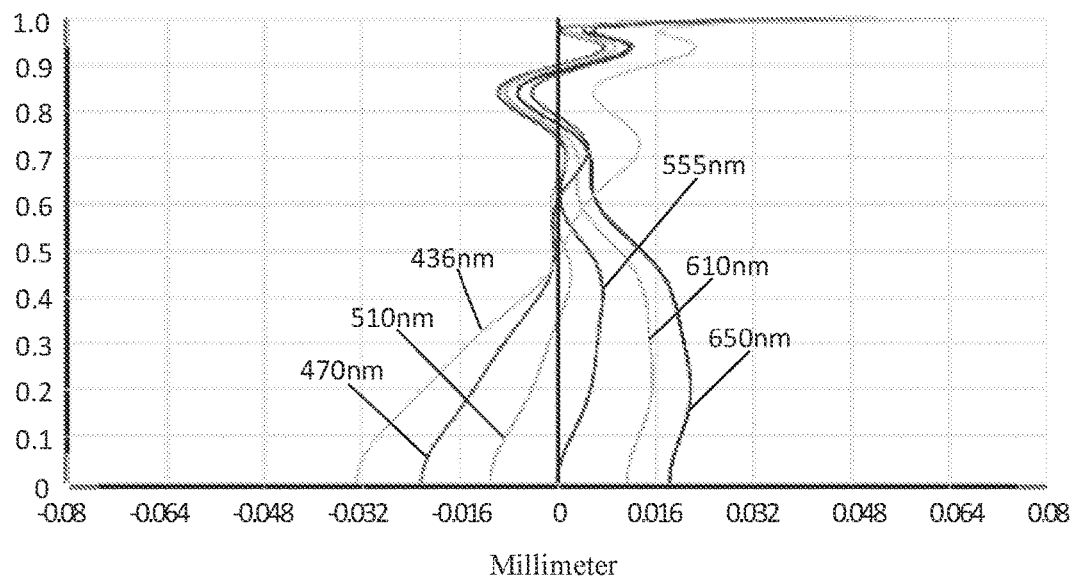
FIG. 2 is a schematic diagram of a longitudinal aberration of the camera optical lens shown in FIG. 1.
Figure 3:
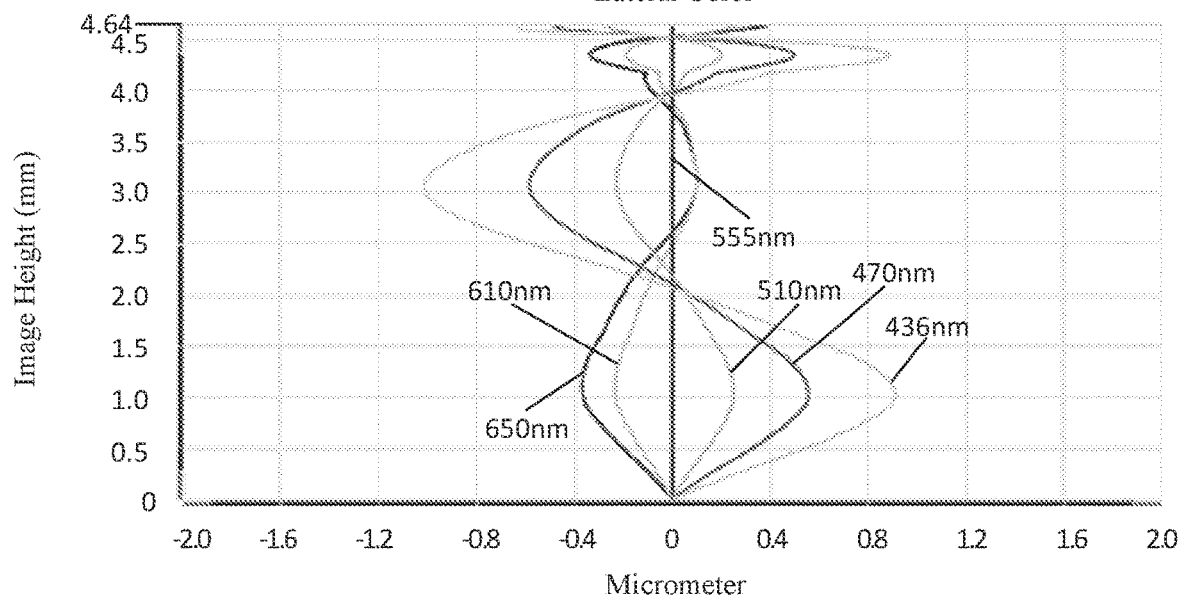
FIG. 3 is a schematic diagram of a lateral color of the camera optical lens shown in FIG. 1.
Figure 4:
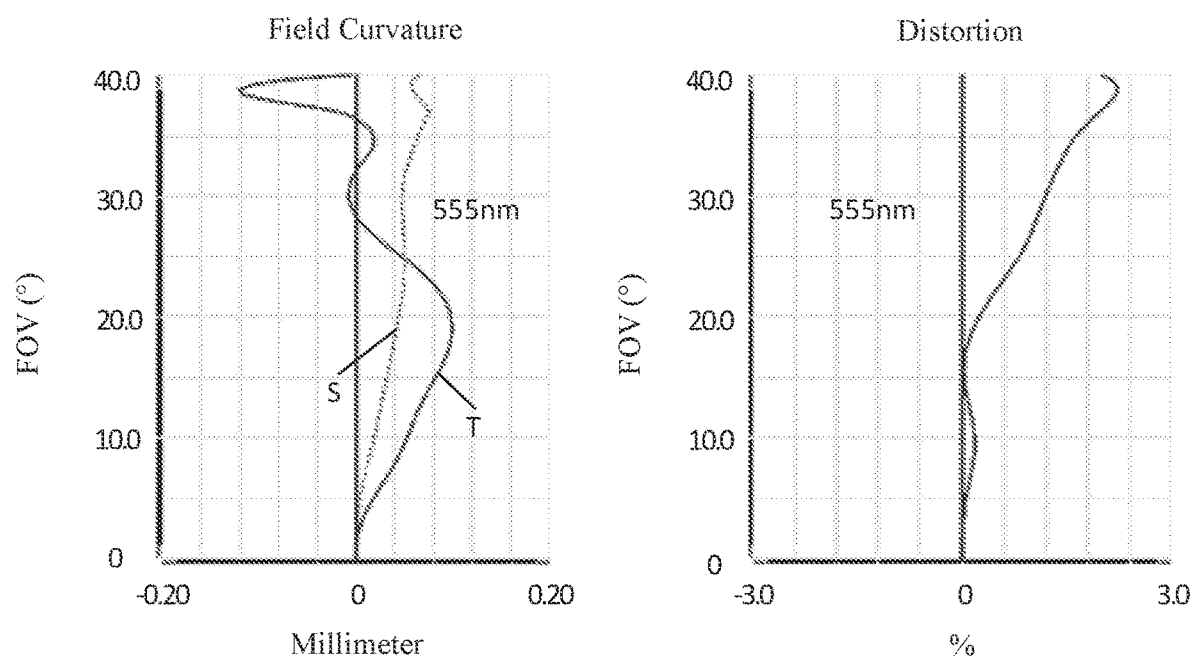
FIG. 4 is a schematic diagram of a field curvature and a distortion of the camera optical lens shown in FIG. 1.
Figure 5:
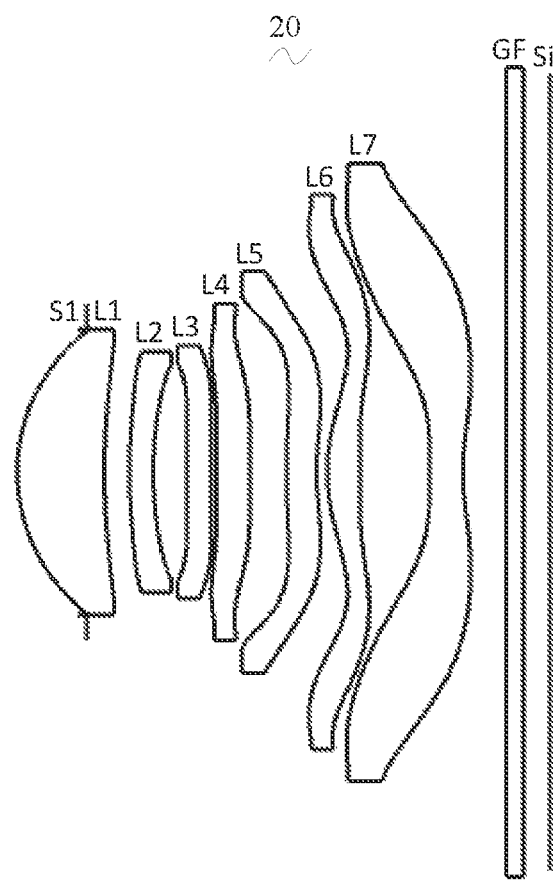
FIG. 5 is a structural schematic diagram of a camera optical lens according to Embodiment 2 of the present disclosure.

FIG. 2 and FIG. 3 illustrate a longitudinal aberration and a lateral color of light with wavelengths of 470 nm, 510 nm, 436 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 below further lists various values of Embodiments 1, 2, and 3 and parameters specified in the above conditions.

As shown in Table 13, Embodiment 1 satisfies the respective conditions.

In the present embodiment, the entrance pupil diameter of the camera optical lens is 3.311 mm. The image height is 4.64 mm. The field of view (FOV) along a diagonal direction is 80.00°. Thus, the camera optical lens 10 is an ultra-thin, large-aperture, wide-angle lens in which the on-axis and off-axis aberrations are sufficiently corrected, thereby having better optical characteristics.

Embodiment 2

Embodiment 2 is basically the same as Embodiment 1 and involves symbols having the same meanings as Embodiment 1. Only differences therebetween will be described as below.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0 = | −0.802 | | | | |
| R1 | 2.041 | d1 = | 1.009 | nd1 | 1.4970 | v1 | 81.60 |
| R2 | 7.396 | d2 = | 0.294 | | | | |
| R3 | 6.057 | d3 = | 0.275 | nd2 | 1.6700 | v2 | 19.39 |
| R4 | 4.055 | d4 = | 0.394 | | | | |
| R5 | 48.288 | d5 = | 0.280 | nd3 | 1.6700 | v3 | 19.39 |
| R6 | 25.433 | d6 = | 0.060 | | | | |

TABLE 5-continued

|     | R       | d      |       | nd     |    | vd    |
|-----|---------|--------|-------|--------|----|-------|
| R7  | 24.923  | d7 =   | 0.392 | nd4 1.5346 | v4 | 55.69 |
| R8  | 88.470  | d8 =   | 0.420 |        |    |       |
| R9  | 5.496   | d9 =   | 0.348 | nd5 1.5661 | v5 | 37.71 |
| R10 | 2.453   | d10 =  | 0.126 |        |    |       |
| R11 | 1.964   | d11 =  | 0.380 | nd6 1.5346 | v6 | 55.69 |
| R12 | −39.500 | d12 =  | 0.817 |        |    |       |
| R13 | −12.666 | d13 =  | 0.380 | nd7 1.5346 | v7 | 55.69 |
| R14 | 2.508   | d14 =  | 0.500 |        |    |       |
| R15 | ∞       | d15 =  | 0.210 | ndg 1.5168 | vg | 64.21 |
| R16 | ∞       | d16 =  | 0.304 |        |    |       |

Table 6 shows aspheric surface data of respective lenses in the camera optical lens 20 according to Embodiment 2 of the present disclosure.

TABLE 6

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −5.3185E−01 | 5.7266E−03 | 5.1008E−03 | −8.0214E−03 | 1.0296E−02 | −7.6764E−03 | 3.4718E−03 | −9.2275E−04 | 1.3080E−04 | −7.6164E−06 |
| R2 | −5.6784E+01 | 6.6769E−03 | −5.7506E−03 | 3.2692E−03 | −1.1647E−02 | 1.4581E−04 | 3.9592E−05 | −1.5692E−05 | 1.8855E−06 | −7.8150E−08 |
| R3 | 1.3524E+01 | −3.9552E−02 | 5.2498E−03 | 9.6071E−03 | −8.6876E−03 | 4.1960E−03 | −1.0908E−03 | 1.5260E−04 | −1.0877E−05 | 3.1071E−07 |
| R4 | 3.4317E+00 | −2.6127E−02 | 4.0606E−03 | 2.4450E−02 | −5.4136E−02 | 8.8670E−02 | −9.2997E−02 | 5.9286E−02 | −2.0815E−02 | 3.1313E−03 |
| R5 | −9.6465E+01 | −1.1893E−02 | −1.1509E−02 | −4.0731E−02 | 7.9952E−02 | 8.3299E−02 | 4.5769E−02 | −1.3203E−02 | 1.9079E−03 | −1.0949E−04 |
| R6 | −9.9000E+01 | −1.0748E−02 | −6.3184E−03 | −8.8405E−02 | 1.9169E−01 | −2.0927E−01 | 1.3594E−01 | −5.3324E−02 | 1.1723E−02 | −1.1065E−03 |
| R7 | −6.7768E+01 | −4.5005E−02 | 1.2131E−03 | −4.4654E−02 | 8.8633E−02 | −6.4348E−02 | 2.4631E−02 | −5.3352E−03 | 6.1841E−04 | −2.9776E−05 |
| R8 | 2.0000E+01 | −6.1170E−02 | 1.8583E−02 | −2.6810E−02 | 2.4682E−02 | −1.0086E−02 | 2.3111E−03 | −3.3945E−04 | 3.3207E−05 | −1.7317E−06 |
| R9 | −1.7898E+01 | 1.2271E−01 | 1.7411E−01 | 1.9532E−01 | 1.4199E−01 | 7.2151E−02 | 2.5017E−02 | −5.5536E−03 | 7.0365E−04 | −3.8300E−05 |
| R10 | −1.8031E+01 | −1.7146E−01 | 1.2712E−01 | −7.3404E−02 | 2.7669E−02 | 7.3745E−03 | 1.5196E−03 | −2.2683E−04 | 2.0193E−05 | −7.6492E−07 |
| R11 | −2.2495E+00 | −7.4367E−02 | 3.6972E−02 | −2.4026E−02 | 7.8445E−03 | −1.3460E−03 | 1.2773E−04 | −6.3761E−06 | 1.2995E−07 | 8.1060E−11 |
| R12 | −8.9029E+01 | 1.2401E−01 | −8.2693E−02 | 2.7010E−02 | −5.7973E−03 | 8.8634E−04 | −9.7214E−05 | 7.2299E−06 | −3.1939E−07 | 6.1937E−09 |
| R13 | 1.1129E+01 | −1.4215E−01 | 5.7628E−02 | 1.1502E−02 | 1.3542E−03 | −9.6661E−05 | 4.0577E−06 | −8.7538E−08 | 4.9257E−10 | 8.3755E−12 |
| R14 | −1.5463E+01 | −6.8153E−02 | 2.0637E−02 | −3.0958E−03 | −2.8336E−05 | 8.5526E−05 | 1.3997E−05 | 1.0952E−06 | −4.3511E−08 | 7.0302E−10 |

Table 7 and Table 8 show design data of inflexion points and arrest points of respective lens in the camera optical lens 20 according to Embodiment 2 of the present disclosure.

TABLE 7

|      | Number of inflexion points | Inflexion point position 1 | Inflexion point position 2 | Inflexion point position 3 | Inflexion point position 4 |
|------|---|-------|-------|-------|-------|
| P1R1 | 0 |       |       |       |       |
| P1R2 | 0 |       |       |       |       |
| P2R1 | 0 |       |       |       |       |
| P2R2 | 0 |       |       |       |       |
| P3R1 | 1 | 0.325 |       |       |       |
| P3R2 | 2 | 0.405 | 1.435 |       |       |
| P4R1 | 3 | 0.275 | 1.065 | 1.705 |       |
| P4R2 | 3 | 0.125 | 1.275 | 1.875 |       |
| P5R1 | 3 | 0.455 | 1.835 | 2.045 |       |
| P5R2 | 4 | 0.395 | 1.835 | 2.025 | 2.255 |
| P6R1 | 2 | 0.815 | 2.075 |       |       |
| P6R2 | 4 | 0.135 | 1.075 | 2.585 | 3.195 |
| P7R1 | 2 | 1.545 | 3.365 |       |       |
| P7R2 | 2 | 0.535 | 3.015 |       |       |

TABLE 8

|      | Number of arrest points | Arrest point position 1 | Arrest point position 2 | Arrest point position 3 |
|------|---|-------|-------|-------|
| P1R1 | 0 |       |       |       |
| P1R2 | 0 |       |       |       |
| P2R1 | 0 |       |       |       |
| P2R2 | 0 |       |       |       |
| P3R1 | 1 | 0.515 |       |       |
| P3R2 | 1 | 0.635 |       |       |
| P4R1 | 2 | 0.465 | 1.395 |       |
| P4R2 | 2 | 0.215 | 1.695 |       |
| P5R1 | 1 | 0.895 |       |       |
| P5R2 | 1 | 0.805 |       |       |
| P6R1 | 2 | 1.405 | 2.835 |       |
| P6R2 | 3 | 0.235 | 1.565 | 3.065 |
| P7R1 | 1 | 3.155 |       |       |
| P7R2 | 1 | 1.145 |       |       |

Figure 6:
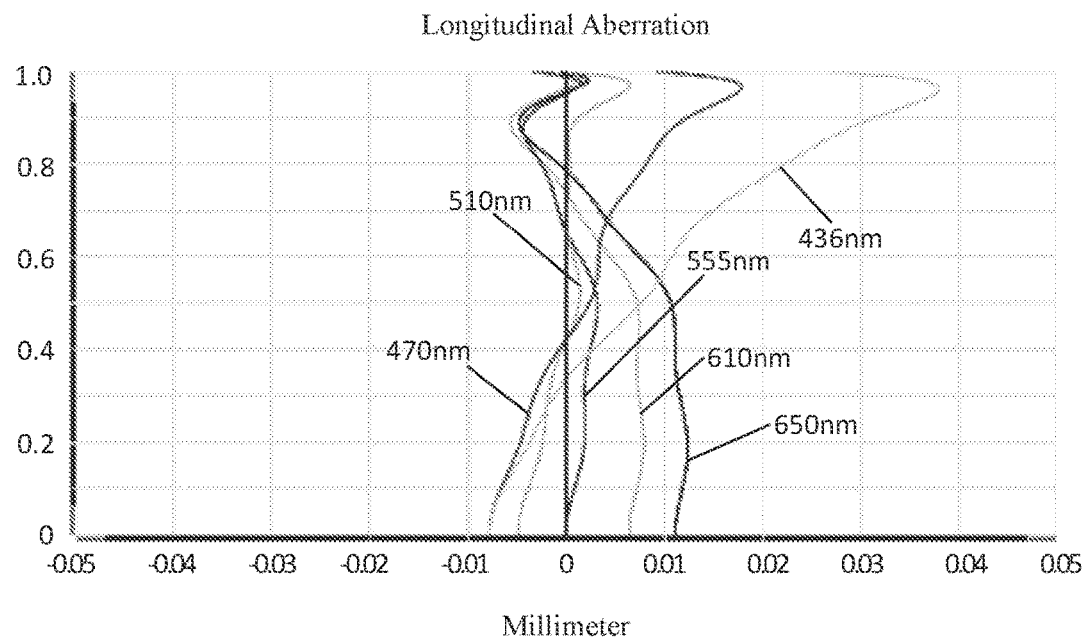
FIG. 6 is a schematic diagram of a longitudinal aberration of the camera optical lens shown in FIG. 5.
Figure 7:
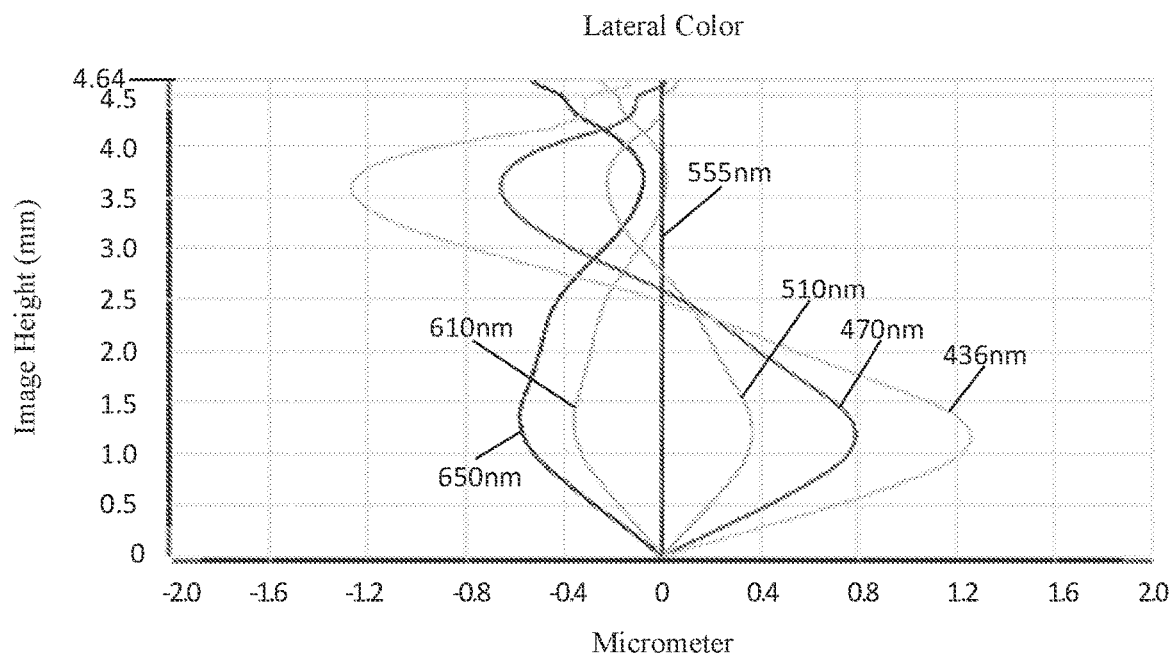
FIG. 7 is a schematic diagram of a lateral color of the camera optical lens shown in FIG. 5.
Figure 8:
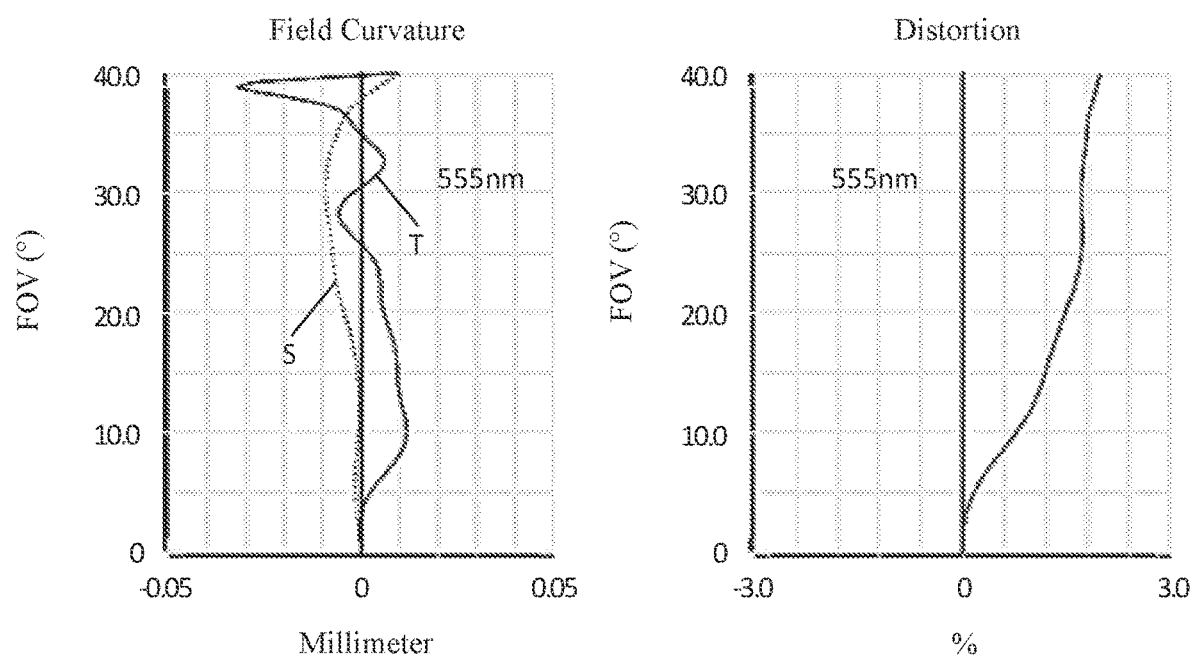
FIG. 8 is a schematic diagram of a field curvature and a distortion of the camera optical lens shown in FIG. 5.
Figure 9:
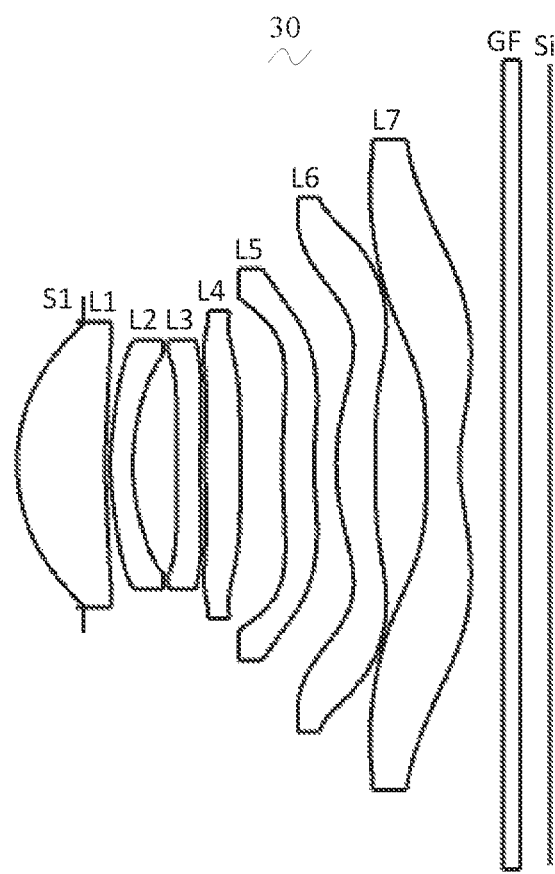
FIG. 9 is a structural schematic diagram of a camera optical lens according to Embodiment 3 of the present disclosure.

FIG. 6 and FIG. 7 illustrate a longitudinal aberration and a lateral color of light with wavelengths of 470 nm, 510 nm, 436 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the respective conditions.

In the present embodiment, the entrance pupil diameter of the camera optical lens is 3.311 mm. The image height is 4.64 mm. The FOV along a diagonal direction is 80.00°. Thus, the camera optical lens 20 is an ultra-thin, large-aperture, wide-angle lens in which the on-axis and off-axis aberrations are sufficiently corrected, thereby having better optical characteristics.

Embodiment 3

Embodiment 3 is basically the same as Embodiment 1 and involves symbols having the same meanings as Embodiment 1. Only differences therebetween will be described as below.

Table 9 and Table 10 show design data of a camera optical lens 30 in Embodiment 3 of the present disclosure.

TABLE 9

|    | R     | d     |        | nd     |    | vd    |
|----|-------|-------|--------|--------|----|-------|
| S1 | ∞     | d0 =  | −0.772 |        |    |       |
| R1 | 2.040 | d1 =  | 1.022  | nd1 1.4970 | v1 | 81.60 |
| R2 | 5.494 | d2 =  | 0.060  |        |    |       |
| R3 | 2.622 | d3 =  | 0.260  | nd2 1.5844 | v2 | 28.22 |

TABLE 9-continued

| | R | d | | nd | | vd | |
|---|---|---|---|---|---|---|---|
| R4 | 2.288 | d4 = | 0.504 | | | | |
| R5 | 31.535 | d5 = | 0.280 | nd3 | 1.6700 | v3 | 19.39 |
| R6 | 11.531 | d6 = | 0.060 | | | | |
| R7 | 12.598 | d7 = | 0.408 | nd4 | 1.5346 | v4 | 55.69 |
| R8 | 90.062 | d8 = | 0.485 | | | | |
| R9 | 4.846 | d9 = | 0.368 | nd5 | 1.5661 | v5 | 37.71 |
| R10 | 3.374 | d10 = | 0.259 | | | | |
| R11 | 2.661 | d11 = | 0.458 | nd6 | 1.5346 | v6 | 55.69 |
| R12 | −39.499 | d12 = | 0.593 | | | | |
| R13 | −42.943 | d13 = | 0.385 | nd7 | 1.5346 | v7 | 55.69 |
| R14 | 2.180 | d14 = | 0.500 | | | | |
| R15 | ∞ | d15 = | 0.210 | ndg | 1.5168 | vg | 64.21 |
| R16 | ∞ | d16 = | 0.339 | | | | |

Table 10 shows aspheric surface data of respective lenses in the camera optical lens 30 according to Embodiment 3 of the present disclosure.

TABLE 10

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | −8.0846E−01 | −6.1070E−03 | 5.3836E−02 | −8.7933E−02 | 8.9824E−02 | −5.7920E−02 | 2.3700E−02 | −5.9502E−03 | 8.2977E−04 | −4.9023E−05 |
| R2 | −9.9000E+01 | −5.0100E−02 | 1.6559E−02 | 1.1540E−01 | −2.3262E−01 | 2.2563E−01 | −1.2898E−01 | 4.4060E−02 | −8.3227E−03 | 6.6902E−04 |
| R3 | 1.5719E+00 | −1.8587E−01 | 1.5665E−01 | −8.9276E−02 | 2.8551E−02 | −4.2087E−03 | 8.2917E−05 | 5.1869E−05 | −5.9463E−06 | 2.0432E−07 |
| R4 | 8.4754E−01 | −1.1445E−01 | 3.0805E−01 | −9.8072E−01 | 2.0755E+00 | −2.7264E+00 | 2.2301E+00 | −1.1069E+00 | 3.0514E−01 | −3.5764E−02 |
| R5 | −2.7177E+01 | −2.3389E−02 | −1.1101E−02 | −7.2059E−04 | 1.5975E−02 | −2.4380E−02 | 1.4193E−02 | −3.8374E−03 | 4.8821E−04 | −2.3641E−05 |
| R6 | 6.5606E+00 | −5.1734E−02 | 8.2501E−02 | 2.2068E−01 | 3.3134E−01 | −2.9897E−01 | 1.6717E−01 | −5.6819E−02 | 1.0769E−02 | −8.6962E−04 |
| R7 | 9.2878E+00 | −5.1712E−02 | 3.3795E−02 | −7.1002E−02 | 8.3399E−02 | −4.8372E−02 | 1.6040E−02 | −3.1385E−03 | 3.3722E−04 | −1.5282E−05 |
| R8 | 2.0000E+01 | −5.8852E−02 | 6.0588E−02 | −9.0964E−02 | 8.1294E−02 | −4.4785E−02 | 1.6035E−02 | −3.5385E−03 | 4.2847E−04 | −2.1669E−05 |
| R9 | −1.9818E+01 | −1.1926E−01 | 1.4958E−01 | −1.5109E−01 | 1.0735E−01 | −5.5845E−02 | 1.9692E−02 | −4.3756E−03 | 5.4894E−04 | −2.9347E−05 |
| R10 | −4.0602E+01 | −1.0889E−01 | 5.5226E−02 | −2.0359E−02 | 6.1478E−03 | −3.0278E−03 | 1.1851E−03 | −2.4039E−04 | 2.3336E−05 | −8.6769E−07 |
| R11 | −2.1537E+00 | −7.3626E−03 | −3.0211E−02 | 1.6027E−02 | −7.1973E−03 | 2.1068E−03 | −3.5456E−04 | 3.3730E−05 | −1.7001E−06 | 3.5455E−08 |
| R12 | −8.0635E+01 | 1.3101E−01 | −8.7799E−02 | 3.0329E−02 | −7.2238E−03 | 1.2440E−03 | −1.4968E−04 | 1.1574E−05 | −5.0426E−07 | 9.2955E−09 |
| R13 | 9.9000E+01 | −1.1304E−01 | 4.2239E−02 | −7.6773E−03 | 8.1706E−04 | −5.2714E−05 | 2.0002E−06 | −3.9003E−08 | 1.9837E−10 | 3.0489E−12 |
| R14 | −1.0524E+01 | −6.8367E−02 | 2.2093E−02 | −4.8499E−03 | 6.0170E−04 | −2.9719E−05 | −1.3476E−06 | 2.4731E−07 | −1.1678E−08 | 1.9357E−10 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 0 | | | |
| P1R2 | 3 | 0.495 | 0.695 | 1.305 |
| P2R1 | 0 | | | |
| P2R2 | 0 | | | |
| P3R1 | 1 | 0.325 | | |
| P3R2 | 2 | 0.455 | 1.385 | |
| P4R1 | 2 | 0.395 | 1.075 | |
| P4R2 | 2 | 0.135 | 1.315 | |
| P5R1 | 2 | 0.465 | 1.865 | |
| P5R2 | 3 | 0.385 | 1.865 | 2.095 |
| P6R1 | 2 | 0.845 | 2.105 | |
| P6R2 | 3 | 0.135 | 1.095 | 2.785 |
| P7R1 | 2 | 1.535 | 3.635 | |
| P7R2 | 3 | 0.585 | 2.575 | 3.715 |

TABLE 12

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 1 | 0.535 | |
| P3R2 | 1 | 0.765 | |
| P4R1 | 2 | 0.675 | 1.305 |
| P4R2 | 2 | 0.225 | 1.625 |
| P5R1 | 1 | 0.945 | |
| P5R2 | 1 | 0.765 | |
| P6R1 | 2 | 1.375 | 2.865 |
| P6R2 | 2 | 0.225 | 1.605 |
| P7R1 | 1 | 3.185 | |
| P7R2 | 1 | 1.275 | |

Figure 10:
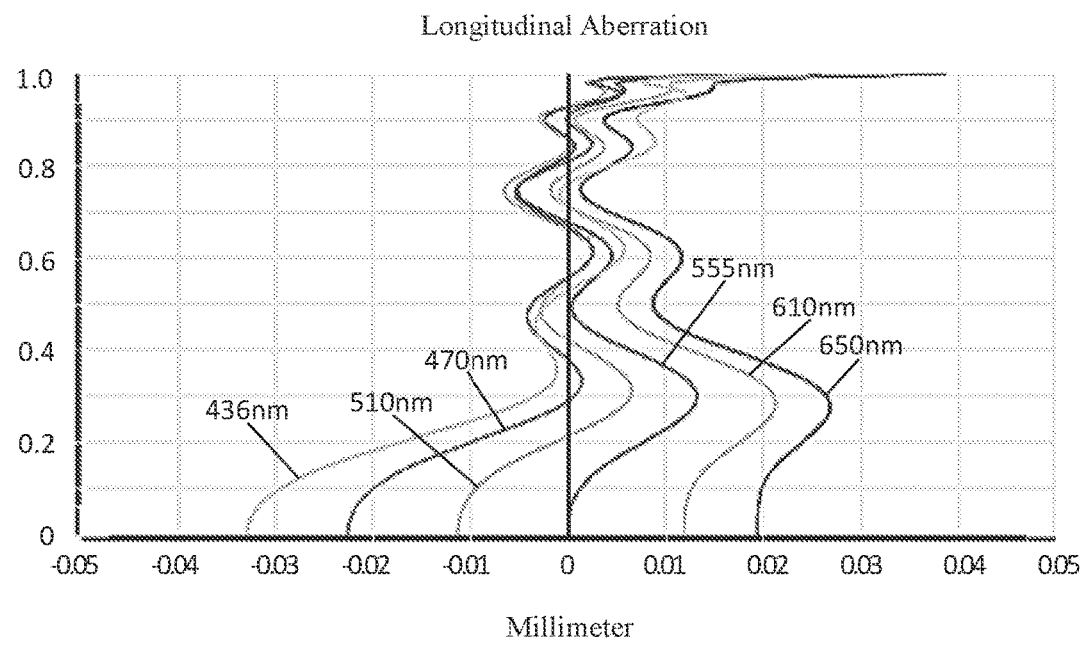
FIG. 10 is a schematic diagram of a longitudinal aberration of the camera optical lens shown in FIG. 9.
Figure 11:
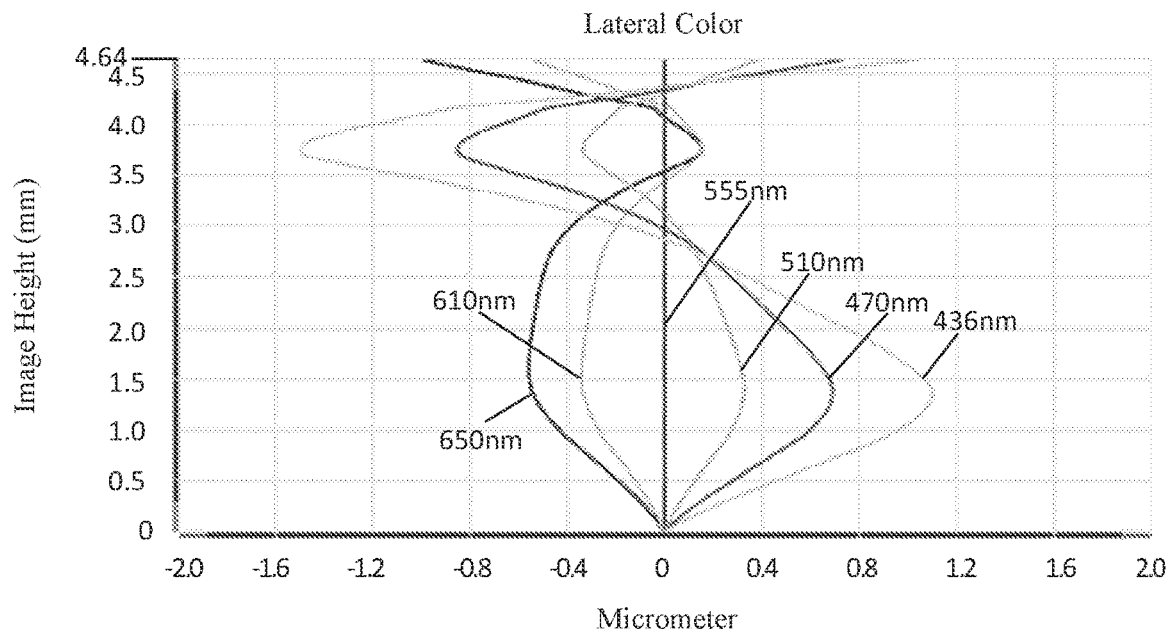
FIG. 11 is a schematic diagram of a lateral color of the camera optical lens shown in FIG. 9.
Figure 12:
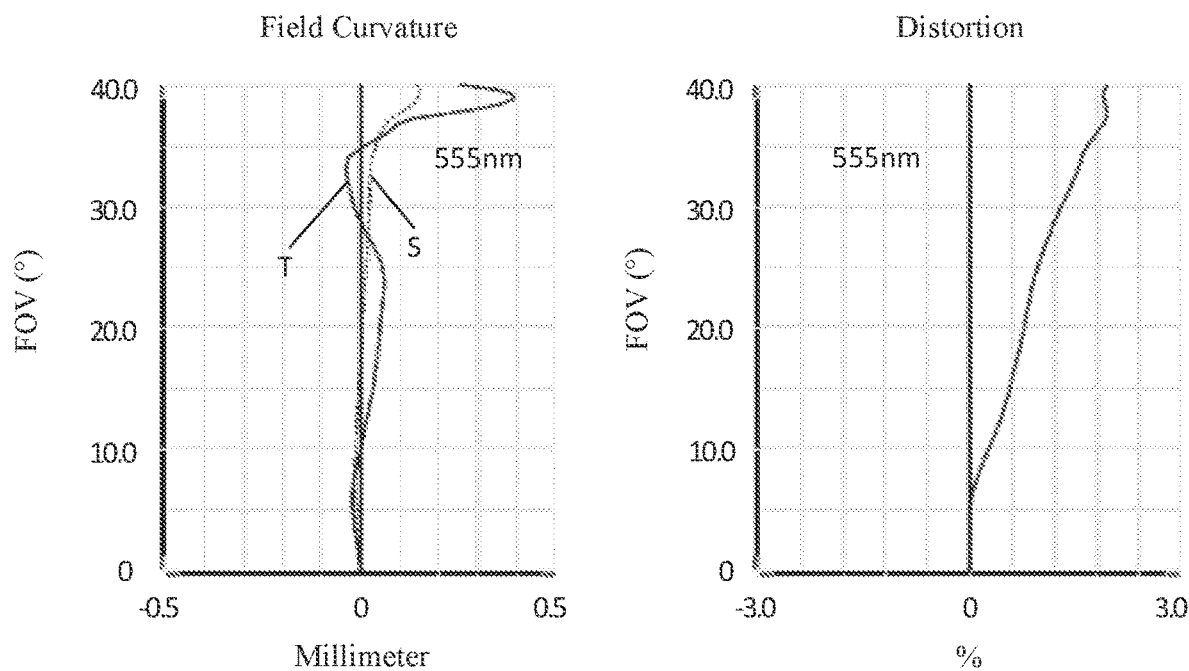
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 510 nm, 436 nm, 555 nm, 610 nm and 650 nm after passing the camera optical lens 30 according to Embodiment 3. FIG. 12 illustrates field curvature and distortion of light with a wavelength of 555 nm after passing the camera optical lens 30 according to Embodiment 3.

Table 13 below further lists various values of the present embodiment and parameters specified in the above conditions. Obviously, the camera optical lens according to the present embodiment satisfies the above conditions.

In the present embodiment, the entrance pupil diameter of the camera optical lens is 3.311 mm. The image height is 4.64 mm. The FOV along a diagonal direction is 80.00°. Thus, the camera optical lens 30 is an ultra-thin, large-aperture, wide-angle lens in which the on-axis and off-axis aberrations are sufficiently corrected, thereby having better optical characteristics.

TABLE 13

| Parameters and Conditions | Embodiment 1 | Embodiment 2 | Embodiment 3 |
|---|---|---|---|
| f | 5.398 | 5.397 | 5.397 |
| f1 | 5.642 | 5.326 | 5.933 |
| f2 | −29.041 | −19.203 | −42.911 |
| f3 | −70.418 | −79.859 | −27.036 |
| f4 | 47.043 | 64.554 | 27.258 |
| f5 | −11.865 | −8.123 | −21.482 |
| f6 | 4.002 | 3.499 | 4.666 |
| f7 | −3.773 | −3.869 | −3.856 |

TABLE 13-continued

| Parameters and Conditions | Embodiment 1 | Embodiment 2 | Embodiment 3 |
|---|---|---|---|
| f12 | 6.405 | 6.568 | 6.391 |
| Fno | 1.63 | 1.63 | 1.63 |
| v1/v2 | 3.95 | 4.21 | 2.89 |
| f4/f | 8.72 | 11.96 | 5.05 |
| f5/f | −2.20 | −1.51 | −3.98 |
| R13/R14 | −6.71 | −5.05 | −19.70 |

Those skilled in the art can understand that the above are only some embodiments of the present disclosure. In practice, those skilled in the art can make various modifications to these embodiments in forms and details without departing from the spirit and scope of the present disclosure.

What is claimed is:

1. A camera optical lens, consisting of, from an object side to an image side:
    a first lens having a positive refractive power;
    a second lens having a negative refractive power;
    a third lens having a negative refractive power;
    a fourth lens having a positive refractive power;
    a fifth lens having a negative refractive power;
    a sixth lens having a positive refractive power; and
    a seventh lens having a negative refractive power,
    wherein the seventh lens includes an object side surface being concave in a paraxial region,
    wherein the camera optical lens satisfies following conditions:

$2.80 \leq v1/v2 \leq 4.30$;

$5.00 \leq f4/f \leq 12.00$;

$-4.00 \leq f5/f \leq -1.50$; and $-20.00 \leq R13/R14 \leq -5.00$, where
    v1 denotes an abbe number of the first lens;
    v2 denotes an abbe number of the second lens;
    f denotes a focal length of the camera optical lens;
    f4 denotes a focal length of the fourth lens;
    f5 denotes a focal length of the fifth lens;
    R13 denotes a curvature radius of an object side surface of the seventh lens; and
    R14 denotes a curvature radius of an image side surface of the seventh lens.

2. The camera optical lens as described in claim 1, wherein the first lens is made of a glass material.

3. The camera optical lens as described in claim 1, further satisfying a following condition:

$5.00 \leq (R3+R4)/(R3-R4) \leq 15.00$, where
    R3 denotes a curvature radius of an object side surface of the second lens; and
    R4 denotes a curvature radius of an image side surface of the second lens.

4. The camera optical lens as described in claim 1, further satisfying a following condition:

$-8.00 \leq f2/f \leq -3.50$, where
    f2 denotes a focal length of the second lens.

5. The camera optical lens as described in claim 1, further satisfying following conditions:

$0.49 \leq f1/f \leq 1.65$;

$-4.45 \leq (R1+R2)/(R1-R2) \leq -1.17$; and $0.08 \leq d1/TTL \leq 0.25$, where
    f1 denotes a focal length of the first lens;
    R1 denotes a curvature radius of an object side surface of the first lens;
    R2 denotes a curvature radius of an image side surface of the first lens;
    d1 denotes an on-axis thickness of the first lens; and
    TTL denotes a total optical length from the object side surface of the first lens to an image plane of the camera optical lens along an optic axis.

6. The camera optical lens as described in claim 1, further satisfying following conditions:

$-29.59 \leq f3/f \leq -3.34$;

$1.08 \leq (R5+R6)/(R5-R6) \leq 9.33$; and $0.02 \leq d5/TTL \leq 0.07$, where
    f3 denotes a focal length of the third lens;
    R5 denotes a curvature radius of an object side surface of the third lens;
    R6 denotes a curvature radius of an image side surface of the third lens;
    d5 denotes an on-axis thickness of the third lens; and
    TTL denotes a total optical length from an object side surface of the first lens to an image plane of the camera optical lens along an optic axis.

7. The camera optical lens as described in claim 1, further satisfying following conditions:

$-4.62 \leq (R7+R8)/(R7-R8) \leq -0.88$; and $0.03 \leq d7/TTL \leq 0.10$, where
    R7 denotes a curvature radius of an object side surface of the fourth lens;
    R8 denotes a curvature radius of an image side surface of the fourth lens;
    d7 denotes an on-axis thickness of the fourth lens; and
    TTL denotes a total optical length from an object side surface of the first lens to an image plane of the camera optical lens along an optic axis.

8. The camera optical lens as described in claim 1, further satisfying following conditions:

$1.31 \leq (R9+R10)/(R9-R10) \leq 8.38$; and $0.03 \leq d9/TTL \leq 0.09$, where
    R9 denotes a curvature radius of an object side surface of the fifth lens;
    R10 denotes a curvature radius of an image side surface of the fifth lens;
    d9 denotes an on-axis thickness of the fifth lens; and
    TTL denotes a total optical length from an object side surface of the first lens to an image plane of the camera optical lens along an optic axis.

9. The camera optical lens as described in claim 1, further satisfying following conditions:

$0.32 \leq f6/f \leq 1.30$;

$-1.81 \leq (R11+R12)/(R11-R12) \leq -0.58$; and $0.03 \leq d11/TTL \leq 0.14$, where
f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

10. The camera optical lens as described in claim 1, further satisfying following conditions:

$-1.43 \leq f7/f \leq -0.47$;

$0.33 \leq (R13+R14)/(R13-R14) \leq 1.36$; and $0.03 \leq d13/TTL \leq 0.11$, where
f7 denotes a focal length of the seventh lens;
d13 denotes an on-axis thickness of the seventh lens; and
TTL denotes a total optical length from an object side surface of the first lens to an image plane of the camera optical lens along an optic axis.

* * * * *